(12) United States Patent
Maibach

(10) Patent No.: US 10,406,451 B2
(45) Date of Patent: Sep. 10, 2019

(54) HIGH EFFICIENCY DISTILLATION HEAD AND METHODS OF USE

(71) Applicant: Lab Society LLC, Frederick, CO (US)

(72) Inventor: Michael S. Maibach, Frederick, CO (US)

(73) Assignee: Lab Society LLC, Boulder, CO (US)

(*) Notice: Subject to any disclaimer, the term of this patent is extended or adjusted under 35 U.S.C. 154(b) by 0 days.

(21) Appl. No.: 16/103,321

(22) Filed: Aug. 14, 2018

(65) Prior Publication Data

US 2019/0060780 A1 Feb. 28, 2019

Related U.S. Application Data

(63) Continuation-in-part of application No. 29/614,928, filed on Aug. 24, 2017, now Pat. No. Des. 828,904.

(60) Provisional application No. 62/580,032, filed on Nov. 1, 2017.

(51) Int. Cl.
  *B01D 3/16* (2006.01)
  *B01D 5/00* (2006.01)
  *B01D 3/02* (2006.01)

(52) U.S. Cl.
  CPC .............. *B01D 3/16* (2013.01); *B01D 3/02* (2013.01); *B01D 5/0003* (2013.01); *B01D 5/006* (2013.01); *B01D 5/0087* (2013.01)

(58) Field of Classification Search
  CPC . B01D 3/16; B01D 5/006; B01D 3/02; B01D 5/0003; B01D 5/0012
  See application file for complete search history.

(56) References Cited

U.S. PATENT DOCUMENTS

| | | | | |
|---|---|---|---|---|
| 2,427,142 A | * | 9/1947 | Hornbacher | G01N 25/145 165/11.1 |
| 2,468,872 A | * | 5/1949 | Goldsbarry | B01D 3/4205 202/185.1 |
| 3,340,157 A | * | 9/1967 | Weiss | B01D 1/0017 202/176 |
| 3,393,133 A | * | 7/1968 | Baird | B01D 3/12 159/13.1 |
| 3,395,083 A | * | 7/1968 | Gilmont | B01L 3/569 202/177 |
| 3,607,662 A | * | 9/1971 | Glover | B01D 3/14 202/160 |
| 3,907,683 A | * | 9/1975 | Gilmont | B01B 1/08 202/177 |
| D254,441 S | | 3/1980 | Lemoine | |

(Continued)

FOREIGN PATENT DOCUMENTS

| | | |
|---|---|---|
| CN | 2702775 Y | 6/2005 |
| CN | 201079707 Y | 7/2008 |

(Continued)

*Primary Examiner* — Jonathan Miller

(74) *Attorney, Agent, or Firm* — Justin McNaughton; Greenspoon Marder LLP

(57) ABSTRACT

A high efficiency distillation head and methods of use has a distillation head that may be used for efficient fractional distillation of high boiling point compounds, and includes a lower insulated jacket surrounding a fractionating column and an upper insulated jacket surrounding a condenser. An exit path of equal or greater cross sectional area to the fractionating column is located at or below the top of the fractionating column.

25 Claims, 13 Drawing Sheets

(56) References Cited

U.S. PATENT DOCUMENTS

| | | | | |
|---|---|---|---|---|
| 4,471,836 A * | 9/1984 | Hokanson | ............... | F28B 9/10 |
| | | | | 165/111 |
| 5,164,049 A * | 11/1992 | Clark | ............... | B01D 1/02 |
| | | | | 134/12 |
| 5,354,428 A * | 10/1994 | Clark | ............... | B01D 1/02 |
| | | | | 159/DIG. 19 |
| 5,885,313 A * | 3/1999 | Okamoto | ............... | B01D 3/085 |
| | | | | 165/110 |
| 6,419,796 B1 * | 7/2002 | Kitamura | ............... | B01D 3/14 |
| | | | | 202/153 |
| 6,551,464 B1 | 4/2003 | Kimel | | |
| 7,267,746 B1 | 9/2007 | Harris et al. | | |
| D595,391 S | 6/2009 | Weltman | | |
| 8,414,744 B2 | 4/2013 | Heydrich et al. | | |
| 9,040,730 B2 | 5/2015 | Liang et al. | | |
| 9,138,657 B1 | 9/2015 | Wiederin et al. | | |
| 9,340,475 B2 | 5/2016 | Mona, III et al. | | |
| D775,310 S | 12/2016 | Kremerman | | |
| D776,238 S | 1/2017 | Kremerman | | |
| D788,316 S | 5/2017 | Kremerman | | |
| 9,649,349 B1 | 5/2017 | Tucker et al. | | |
| D790,033 S | 6/2017 | Kremerman | | |
| 9,682,331 B2 * | 6/2017 | Kremerman | ............... | B01D 3/10 |
| D802,084 S | 11/2017 | Kremerman | | |
| D802,085 S | 11/2017 | Kremerman | | |
| D805,599 S | 12/2017 | Kremerman | | |
| D805,600 S | 12/2017 | Kremerman | | |
| D806,829 S | 1/2018 | Kremerman | | |
| 9,895,626 B2 * | 2/2018 | Kremerman | ............... | B01D 3/26 |
| 9,895,627 B2 | 2/2018 | Kremerman | | |
| 9,956,501 B2 | 5/2018 | Balass | | |
| D819,779 S | 6/2018 | Kremerman | | |
| 10,029,188 B2 | 7/2018 | Kremerman | | |
| 10,159,907 B2 | 12/2018 | Kremerman | | |
| 2015/0136158 A1 * | 5/2015 | Stevens | ............... | A24F 47/008 |
| | | | | 131/329 |
| 2017/0003264 A1 * | 1/2017 | Adams | ............... | G01N 33/2823 |
| 2018/0065060 A1 * | 3/2018 | Wells | ............... | B01D 3/12 |
| 2018/0078874 A1 | 3/2018 | Russelthomas | | |
| 2018/0140965 A1 | 5/2018 | Flora et al. | | |
| 2018/0282250 A1 | 10/2018 | Rutz et al. | | |
| 2018/0290074 A1 | 10/2018 | Kremerman | | |

FOREIGN PATENT DOCUMENTS

| | | |
|---|---|---|
| CN | 202823431 U | 3/2013 |
| CN | 103623880 B | 8/2015 |
| CN | 105606423 A | 5/2016 |
| CN | 205287678 U | 6/2016 |
| CN | 205598689 U | 9/2016 |
| CN | 207877682 U | 9/2018 |
| EP | 2294931 A1 | 3/2011 |

* cited by examiner

HIGH EFFICIENCY DISTILLATION HEAD AND METHODS OF USE

CROSS-REFERENCE TO RELATED APPLICATIONS

The present application claims priority benefit of U.S. Design patent application No. 29/614,928, filed Aug. 24, 2017, and it claims the priority benefit of U.S. Provisional Application No. 62/580,032, filed Nov. 1, 2017, the contents of which are incorporated in their entirety herein by reference.

BACKGROUND OF THE INVENTION

This disclosure relates to the general field of distillation, and more specifically toward a high efficiency distillation head and methods of use. The distillation head may be used for efficient fractional distillation of high boiling point compounds, and includes a lower insulated chamber (i.e., a jacket or a vacuum jacket) surrounding or wrapped around a fractionating column (also called a path, inner tube, fractionating column, or fractionating tube) and an upper insulated chamber (i.e., a jacket or vacuum jacket) surrounding a condenser. The lower insulated chamber may also feature a vacuum chamber having silvering (mirroring) inside of the vacuum chamber to increase thermal and infrared heat retention in the fractionating column within the lower insulated chamber, while leaving the upper insulated chamber un-silvered (not mirrored) to allow for a temperature differential between the condenser in the upper chamber and the fractionating column in the lower chamber for improved (more efficient) condensation of fractionated vapors. An exit path, having a cross sectional area that is greater than or substantially equal to the cross section of the fractionating column, is located vertically within the distillation head at or below the top of the fractionating column.

Distillation systems, specifically fractional distillation systems, separate mixtures into their component parts, or fractions, by heating the mixtures to a temperature that causes one or more fractions to vaporize. The heated vapors ascend through a fractionating column, some of which condense and revaporize along a temperature gradient. In existing systems, vapor exits through a small exit hole or restriction in the column for condensation as the vapor passes out of the fractionating column. However, the small exit hole slows throughput and provides a small condensation surface area for collecting the distillate.

Current designs also utilize a coolant jacket for the upper condenser portion, in addition to a long or extended fractionating column that extends into the upper condenser. Such a design is not ideal because utilizing coolant rather than a vacuum chamber requires at least one additional mechanical accessory (and creates additional complexity), and it also decreases the efficiency of the distillation head. The longer the fractionating column in these designs, the more energy required to force the vapors to exit the top of the condenser (because there is no direct insulation around the fractionating column).

Thus there has existed a long-felt need for an improved, efficient distillation head and fractionating column to distill compounds, including high boiling point compounds, while minimizing the use of heat, energy, and/or coolant. One of the benefits of the present high efficiency design is that the fractionating column is shortened and the lower insulated chamber has greatly increased thermal retention; thus, the disclosed device requires significantly less heat to allow fractionated vapors to exit the shortened column to the upper condenser.

SUMMARY OF THE INVENTION

The current invention provides a high efficiency distillation head and methods of use. The distillation head may be used for efficient fractional distillation of high boiling point compounds, and includes a lower insulated chamber surrounding a fractionating column and an upper insulated chamber surrounding a condenser. An exit path having a cross sectional area that is equal to or greater than the cross sectional area of the fractionating column is located on the distillation head at or below the top of the fractionating column. The lower insulated chamber can also feature a vacuum chamber having silvering (mirroring) inside of the vacuum chamber (i.e., vacuum jacket) to increase thermal and infrared heat retention, while leaving the upper insulated chamber un-silvered (not mirrored), which allows for a greater temperature differential and greater condensation efficiency of fractionated vapors.

A distillation head according to selected embodiments may be used in conjunction with a vacuum system and heated boiling flask (with product inside) to fractionate and separate high boiling point compounds. The device can be used, for example, to separate cannabinoids, from other constituents found in *cannabis* oils or constituents from other herbs. The fractionating column is engineered to promote separation while keeping the fractionating column short enough to keep the energy required below a certain threshold and maintaining the compound in its vapor phase. In one embodiment, the threshold is 175° C. In one embodiment, the threshold is 180° C. In another embodiment, the threshold is 190° C. In one embodiment, the threshold is 200° C. In another embodiment, the threshold is between about 175° C. and about 210° C. This works by employing two insulated chambers, a lower insulated chamber and an upper insulated chamber. The lower insulated chamber is hotter because it is heated by the vapor in the fractionating column and the upper insulated chamber is cooler to promote condensation of vapors exiting the fractionating column. A feature of this design compared to others is that the fractionating column exits to a larger condenser thereby resulting in much higher condensation (flow) rates in the head. Another feature of this design compared to others is that both the lower and upper insulation chambers feature vacuum chambers (i.e., vacuum jackets), with the lower insulated vacuum chamber having the option of silvering (mirroring). Utilizing this dual-chamber design, the distillation head can maintain a temperature differential between the lower vacuum chamber (fractionating) and the upper vacuum chamber (condensing) without the use of coolants, heaters, or chillers. Essentially, anything exiting the fractionating column has the ability to condense—unlike in previous designs where purified vapors had to exit a restriction area or small hole/opening and enter a secondary condenser. The improvement in efficiency due to a larger exit hole (less hold up or restriction) and larger condensation surface area, is a significant improvement over previously produced distillation heads/columns.

It is an object of the disclosure to provide an efficient distillation head and fractionating column to distill compounds, including high boiling point compounds.

It is another object of the disclosure to provide a distillation head and fractionating column to distill high boiling point compounds.

It is a further object of this disclosure to provide a method of efficiently distilling high boiling point compounds.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise. As used herein the term "substantially equal to" refers to within ten percent of the value.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features of the disclosure in order that the detailed description thereof may be better understood, and in order that the present contribution to the art may be better appreciated. There are additional features of the disclosure that will be described hereinafter and which will also form the subject matter of the claims appended hereto. The features listed herein and other features, aspects and advantages of the present disclosure will become better understood with reference to the following description and appended claims.

BRIEF DESCRIPTION OF DRAWINGS

The accompanying drawings, which are incorporated in and form a part of this specification, illustrate embodiments of the disclosure and together with the description, serve to explain the principles of this invention.

DETAILED DESCRIPTION OF THE PREFERRED EMBODIMENT(S)

Figure 1:
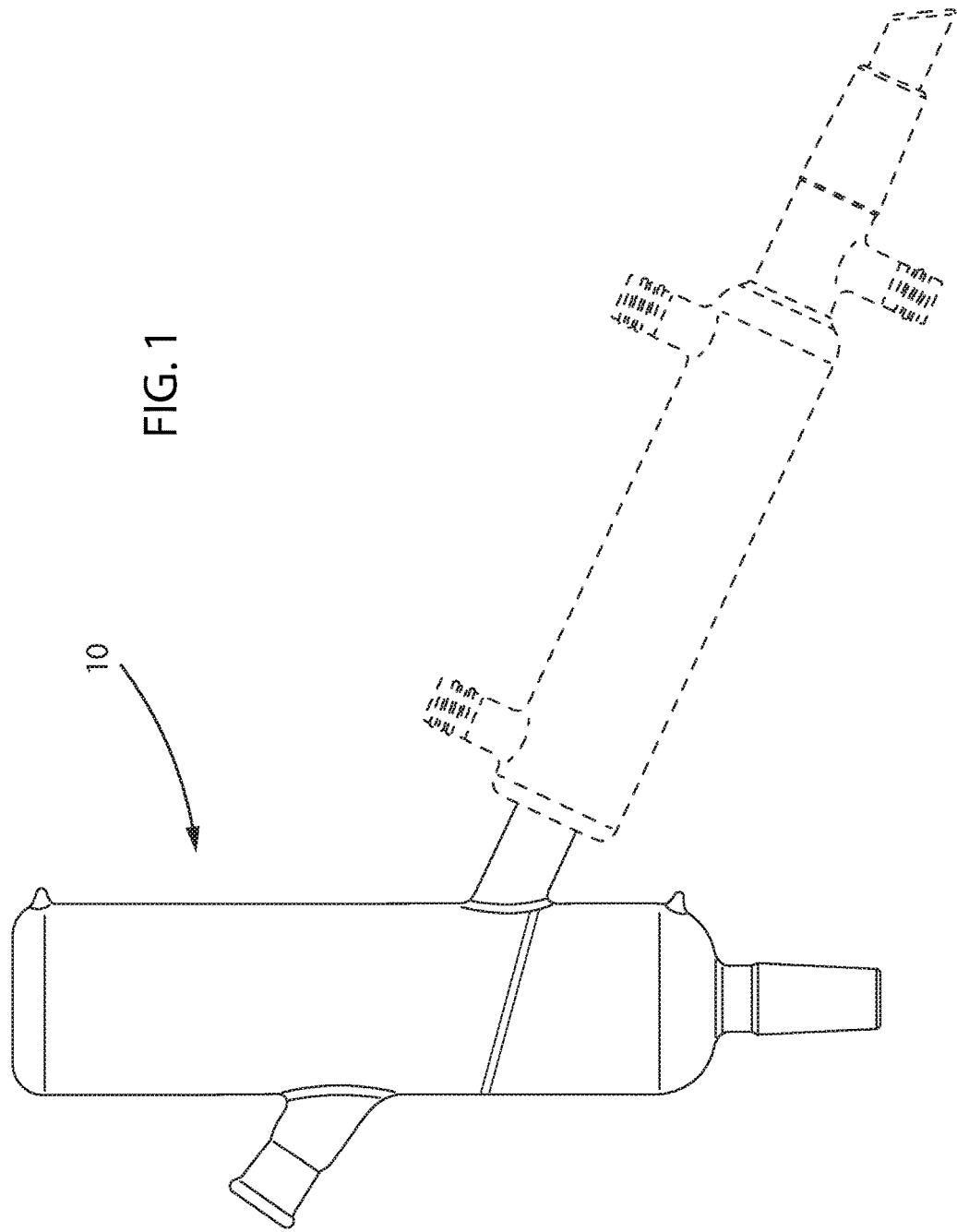
FIG. 1 is a right side elevational view of a distillation head according to selected embodiments of the current disclosure.
Figure 2:
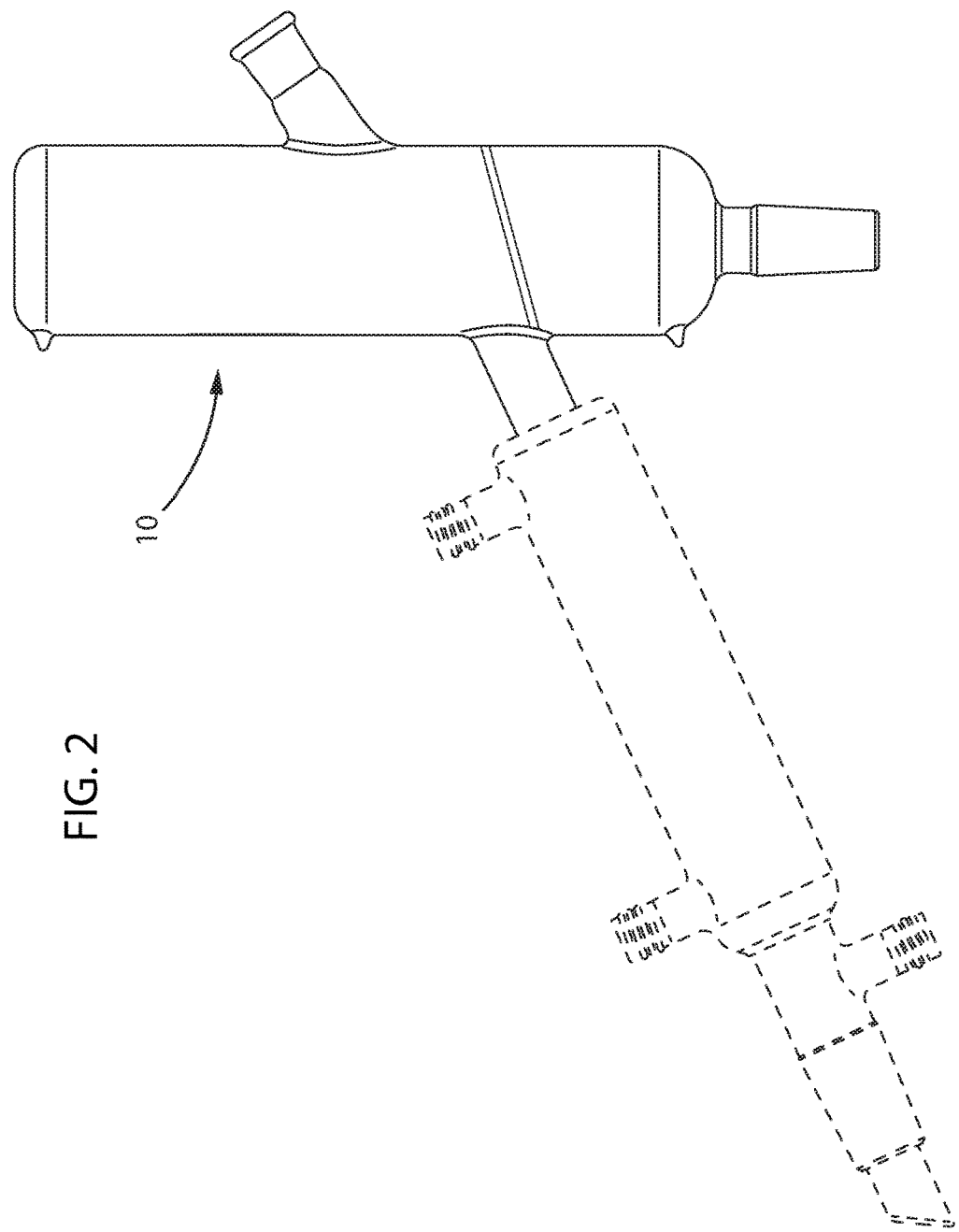
FIG. 2 is a left side elevational view of a distillation head according to selected embodiments of the current disclosure.
Figure 3:
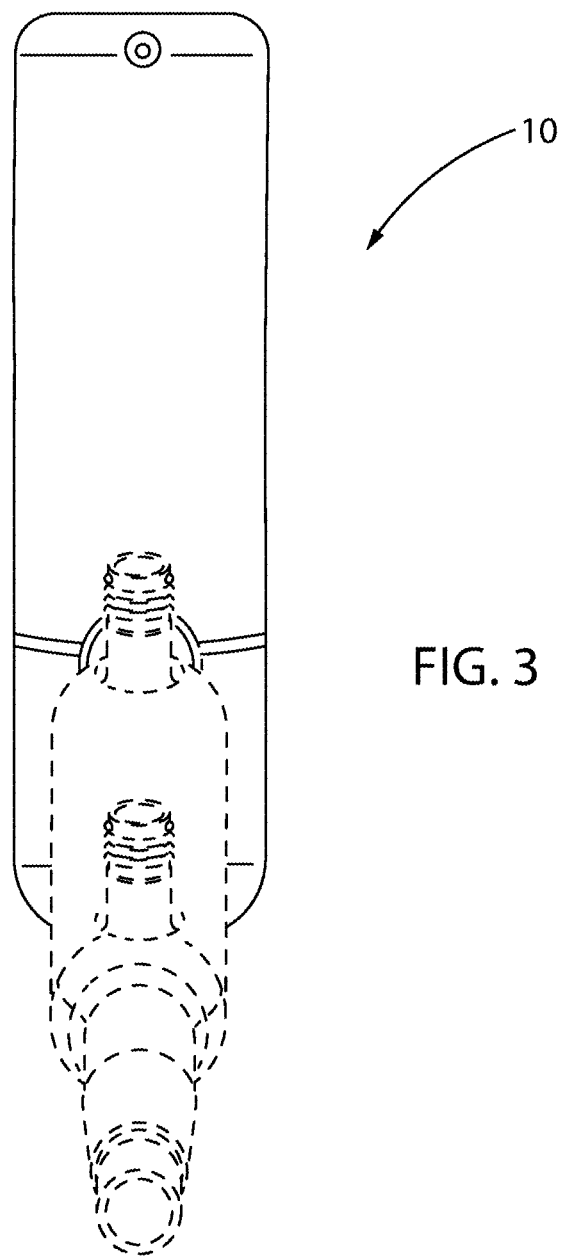
FIG. 3 is a front elevational view of a distillation head according to selected embodiments of the current disclosure.
Figure 4:
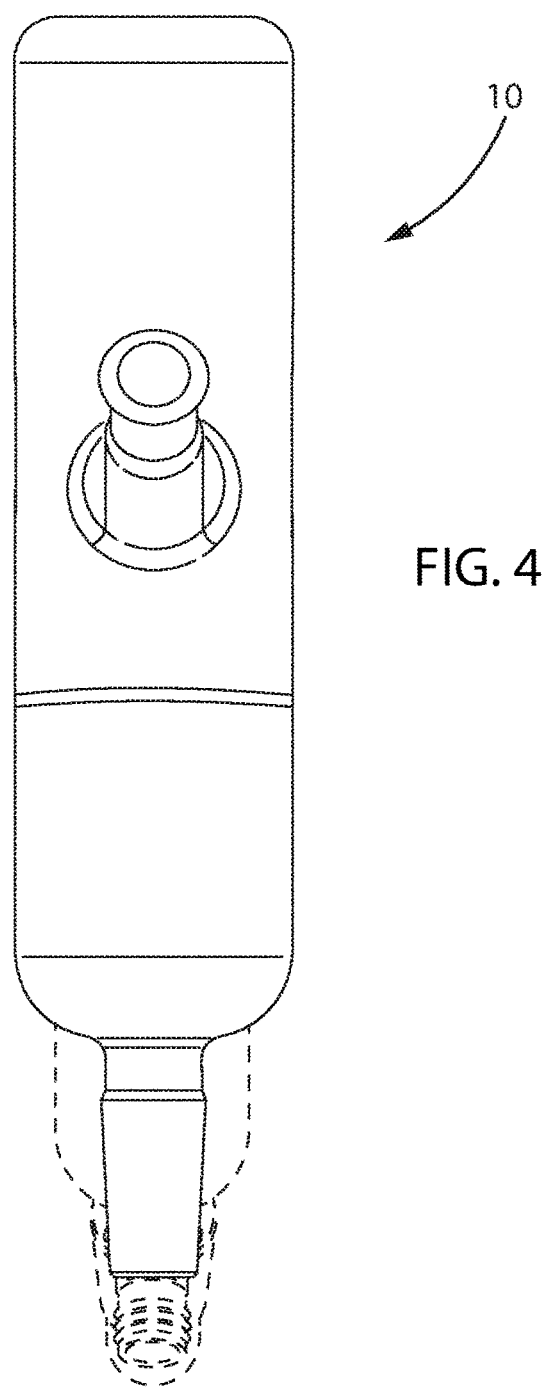
FIG. 4 is a rear elevational view of a distillation head according to selected embodiments of the current disclosure.
Figure 5:
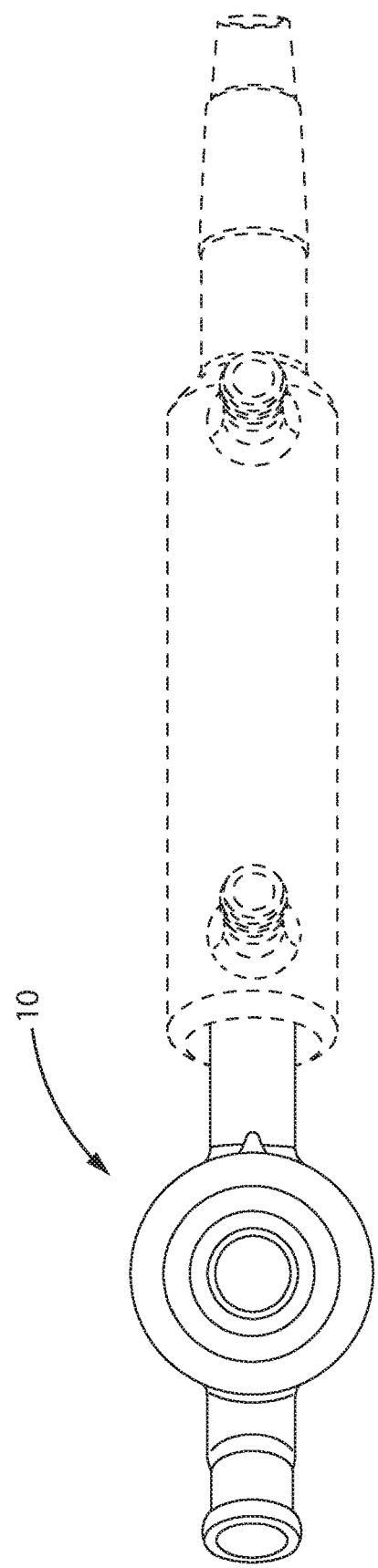
FIG. 5 is top plan view of a distillation head according to selected embodiments of the current disclosure.
Figure 6:
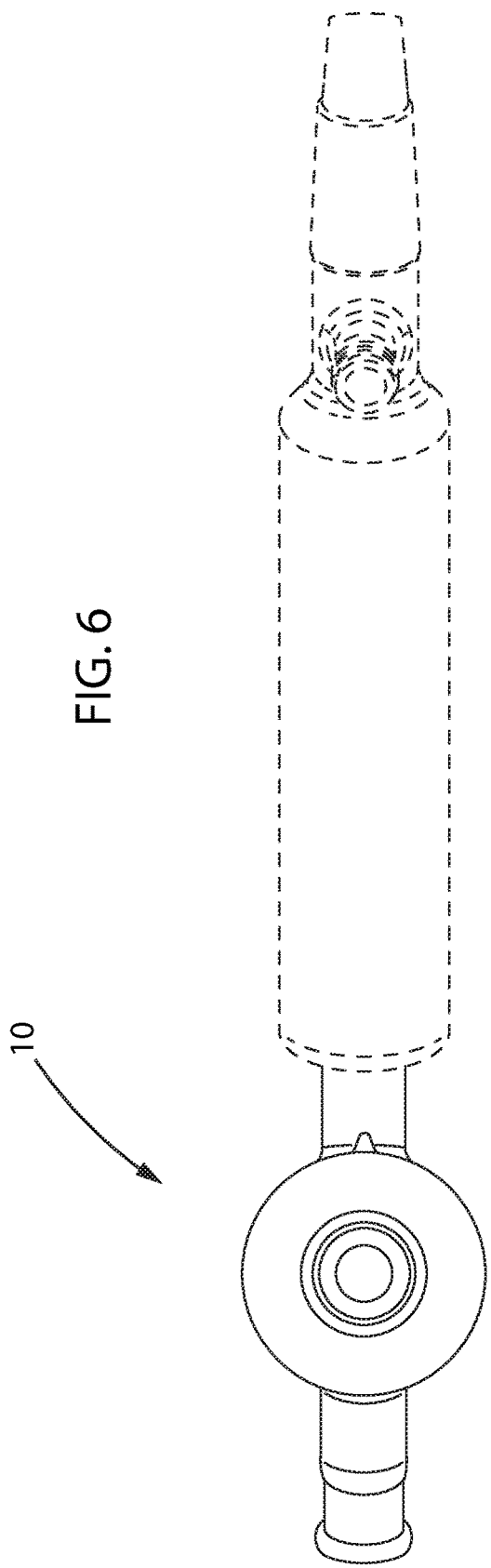
FIG. 6 is a bottom plan view of a distillation head according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

The distillation head is made up of two main parts: the lower insulated chamber surrounding the fractionating column and the upper insulated chamber surrounding the condenser. The device has heat insulation surrounding the fractionating column, which may be filled with an array of packing materials or structured packings to increase surface area for fractionation. In one embodiment the packing materials are glass beads or any other objects suitable for use in a distillation head that increase the surface area. Once heated by vapor passing through it, the lower insulated chamber contains heat within the fractionating column that begins to fractionate vaporized compounds as they rise through the fractionating column, interacting with pockets of liquids on the surface of the fractionating column/packing. Once the vapors reach the top of the lower insulated chamber, they quickly begin to cool as they exit the fractionating column, which fractionating column has an opening at least as wide as the diameter or cross-section of the exit. In some embodiments, the diameter of the exit is wider than the diameter of the fractionating column.

Because the fractionating column has a similar cross sectional area to the vapor outlet (exit), the low-hold up design allows for maximum vapor throughput and condensation on the outer walls of the upper insulated chamber. The larger surface area of the inner "dome" of the condenser (i.e., the upper jacket which is vacuum insulated) condenses purified vapors into liquids after they have exited the fractionating column. These condensed vapors, now liquids, flow down towards the sloped bottom of the condenser towards the exit. The exit port has the same inner diameter or cross-sectional area as the fractionating column which allows for maximum vacuum flow without restricting the flow rate. Other embodiments provide for an exit port that has a larger diameter or cross-sectional area than the fractionating column.

The fractionating column is relatively short and does not extend into the condenser. Utilizing silvering inside of the walls of the lower insulated chamber (for infrared heat retention) greatly improves the efficiency of this design. In one embodiment, the lower insulated chamber is a vacuum chamber and the silvering is applied while it is unsealed (open at bottom) before it is sealed. In one embodiment, the silvering is a Silver Nitrate spray coating (usually applied leaving a viewing strip for the fractionating column). The silvering can be any reflective material that reflects infrared radiation, whether its actual color is silver, gold, bronze, rose gold, or any other color. Once the silvering is applied, the lower insulated chamber (i.e., vacuum jacket) is sealed with the silver nitrate coating its interior walls. The silvering of the lower insulated chamber reflects and traps infrared radiation, or long wave electromagnetic radiation which would otherwise escape through the glass. The visible thermal improvements from adding silvering are easily viewable via thermal imaging cameras (FLIR cameras) that detect long wave infrared; when measuring the surface temperatures of the portions of the device with silvering, they appear significantly cooler at high temperatures.

The silvering on the lower insulated chamber coupled with an un-silvered upper insulated chamber creates an increased temperature differential from the hot lower vacuum chamber to the cool upper insulated chamber thereby causing rapid condensation and increases the maximum throughputs of main fractions (the primary constituent being extracted).

In traditional distillation heads, the flow rates for a 24/40 condenser are between about 100 to 200 g/hr and for a 34/45 condenser. The flow rates for a 34/45 distillation head are generally between about 250-500 g/hr.

| Size Distillation Head | Output Range of Traditional Distillation Head | Output Range of Disclosed Distillation Head |
| --- | --- | --- |
| 24/40 Distillation Head | 100-200 g/hour | 250-500 g/hour |
| 34/45 Distillation Head | 250-500 g/hour | 350-1000 g/hour |

In one embodiment, the throughput rate of the currently disclosed fractionating column and distillation head is 30% to 300% greater than traditional distillation heads. In one embodiment, the currently disclosed distillation head is larger than existing traditional distillation heads and has a throughput above 1000 g/hour. In one embodiment, the temperature differential between the lower insulation chamber 22 and the upper insulation chamber 31 of the device is between about 5 and 30° C.

FIGS. 1-6 show various views of a distillation head 10 according to selected embodiments of the current disclosure.

Figure 7:
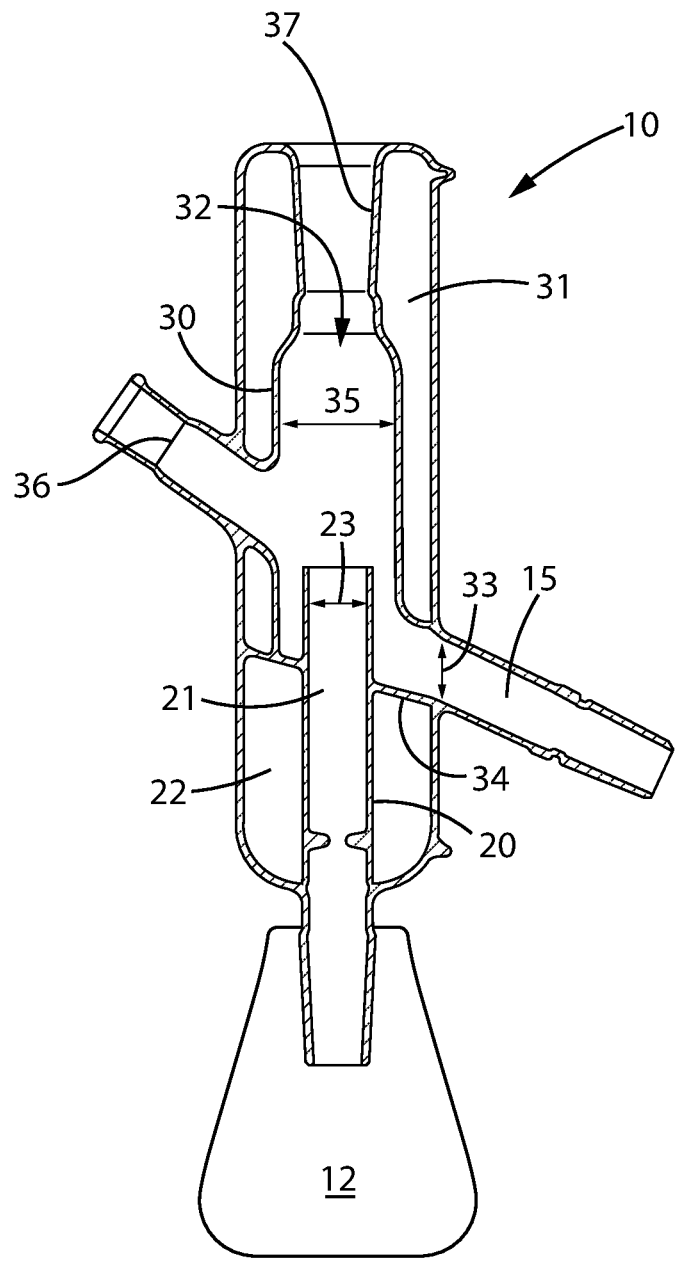
FIG. 7 is a right side cutaway of a distillation head according to selected embodiments of the current disclosure.

FIG. 7 is a right side cutaway of a distillation head 10 according to selected embodiments of the current disclosure. The distillation head 10 includes a fractionating column 21 surrounded by a lower insulation chamber (i.e., a lower jacket) 22. In certain embodiments, the inner wall 20 of the lower insulation chamber 22 is silvered to help retain infrared heat. In one embodiment, the lower insulation chamber 22 surrounds, encircles, wraps around or fits around fractionating column 21 to further retain heat within the fractionating column 21. Certain embodiments of the current disclosure have a lower vacuum insulating chamber 22, wherein the chamber is devoid or substantially devoid of matter. Alternative embodiments provide for a chamber that is filled with insulating material or insulated, for example using vacuum jackets, double vacuum jackets, inert gas, physical insulation, heating oil jacket, liquid jackets, fiberglass, or any other form of insulation. The fractionating column 21 has an inner diameter 23 that, in the embodiment shown in this figure, is substantially constant along its vertical length. Nonetheless, projections, protrusions, packing, or other elements may extend from the inner surface of the fractionating column or reside within the fractionating column 21 to increase surface area for fractionation. In some embodiments, the distillation head 10 has an optional upper joint 37. In some embodiments, the distillation head 10 has an optional side joint 36.

Vapors are supplied to the fractionating column 21 by a contained source, for example, a heated boiling flask 12, though other sources of vapors are contemplated by the current disclosure, including those that provide a continuous feed of vapors. Vapors exit the column 21 to enter into the condenser 32.

In some embodiments, the condenser 32 has an upper jacket 31. In certain embodiments, the upper jacket is non-silvered to increase infrared heat transfer out of the condenser to help maintain cooler temperatures inside the condenser 32. In some embodiments, an upper insulation chamber 31 surrounds, encircles, wraps around or fits around the condenser 32. Certain embodiments of the current disclosure have an upper vacuum insulating chamber 31, wherein the chamber is devoid or substantially devoid of matter. Alternative embodiments provide for an upper insulating chamber 31 that is filled with insulating material or insulated, for example, using vacuum jackets, double vacuum jackets, inert gas, physical insulation, heating oil jackets, liquid jackets, fiberglass, or any other form of insulation.

In some embodiments (not shown), the condenser has no upper jacket surrounding it, but only a single glass wall, while the lower end of the fractionating column has a lower, silvered jacket, which can further differentiate the temperature within the fractionating column compared to the uninsulated condenser. In other embodiments, the condenser has no upper jacket surrounding it and the condenser has no lower jacket, but the outer walls of the fractionating column are silvered, which can further differentiate the temperature within the silvered fractionating column compared to the uninsulated, unsilvered condenser. In some embodiments, the condenser has an upper jacket surrounding it, while the lower end of the fractionating column has no lower jacket, but only a single glass, silvered wall, which can differentiate the temperature within the silvered fractionating column compared to the insulated condenser.

In one embodiment, the fractionating column 21 extends upwards and into the condenser 32 through a floor 34 of the condenser 32. The condenser 32 has an inner diameter 35 that is greater than the inner diameter 23 of the fractionating column 21. Additionally, the condenser 32 can have a cross sectional area that is greater than the cross sectional area of the fractionating column 21.

The floor 34 of the condenser 32 slopes downwards towards an exit or distillate port 15 allowing for the exit of distillate out of the chamber of the condenser 32. The distillate port 15 has a diameter 33. In certain embodiments, the diameter 33 of the distillate port 15 is equal to or substantially equal to the diameter 23 of the fractionating column 21. In other embodiments, the diameter 33 of the distillate port 15 is greater than the diameter 23 of the fractionating column 21. Alternatively (or in addition to), the openings of the distillate port 15 and the fractionating column 21 may be defined by a cross sectional area, in which case the cross sectional area of the distillate port 15 is equal to or substantially equal to the cross sectional area 23 of the fractionating column 21. Accordingly, in alternative embodiments, the cross sectional area 33 of the distillate port 15 is greater than the cross sectional area 23 of the fractionating column 21 and in other embodiments, the cross sectional area 33 of the distillate port 15 is smaller than the cross sectional area 23 of the fractionating column 21.

The distillate port 15 is located at the lowest point of the floor 34 so that condensate flows by gravity to the distillate port 15 down the sloped floor 34. Moreover, in this embodiment, the distillate port 15 is located below the exit of the fractionating column 21.

To distill a compound, heat is applied to the compound underneath the distillation head 10 causing at least some portion of it to vaporize. The resulting vapors enter the fractionating column 21 of the distillation head 10 for fractionation. The fractionating column 21 bounded by the lower insulation chamber (i.e., lower jacket) 22 fractionates compounds as they rise in vapor form through the fractionating column 21, interacting with pockets of liquids on the surface of the fractionating column 21 and any packing therein. Highly distilled vapors flow up and out of the fractionating column 21 and into the condenser 32. The vapors condense within the condenser 32 to form a liquid, which flows downwards along the walls of the condenser 32 towards the floor 34, and then down the sloped floor 34 to the distillation port 15 or exit.

In one embodiment, the present disclosure comprises a method of distilling a compound comprising the steps of: supplying a vapor from a contained source to a distillation head, where the distillation head comprises: (i) a column with a surrounding insulation chamber, the column having an inner diameter; (ii) a condenser with a surrounding insulation chamber, the condenser having an inner diameter and a floor; and (iii) a distillation port, the distillation port having an inner diameter; (iv) wherein the column extends through the floor of the condenser, the floor of the condenser slopes downward towards the distillation port, the inner diameter of the distillation port is substantially equal to or greater than the inner diameter of the column, and the inner diameter of the condenser is greater than the inner diameter of the column; condensing the vapor to a liquid in the condenser; and collecting liquid from the distillation port. The contained source can be a boiling flask, a flask or vessel with an oil jacket or a electric mantels, a flask or vessel heated by steam, or any other heated vessel. The insulation chamber around the column can be a vacuum chamber. The insulation chamber around the condenser can also be a vacuum chamber. The distillation head can comprise a silver lining on the insulation chamber around the column, wherein the silver lining reflects infrared radiation, preventing it from escaping the insulation chamber around the column. The silvering increases the efficiency and allows distillation at much lower temperatures than previous devices, in some embodiments, resulting in efficiency increases of 10-35% over existing distillation heads. The vapor can be supplied to the distillation head through the column. The method can further comprise the step of maintaining a temperature differential of between about 5° and 30° Celsius between the condenser and the column. The contained source can be a boiling flask attached to the distillation head.

In some embodiments, one or two inlet ports 36, 37 may pierce through the upper vacuum jacket to provide the ability for packing insertion into fractionating column 21, which can, optionally, have Vigreux indents 25 (i.e., packing retainer indents or indents) to support packing at bottom of column 21, increase the surface area, and increase the turbulence inside the fractionating column 21. The inlet ports may also be used for temperature/pressure sensing via a thermocouple or thermometer immersed into the column to obtain vapor temperature measurements of compounds exiting column 21. These inlet ports 36, 37 are not required for operation, but do allow for additional data collection and/or modularity of the optional packing material.

Figure 8:
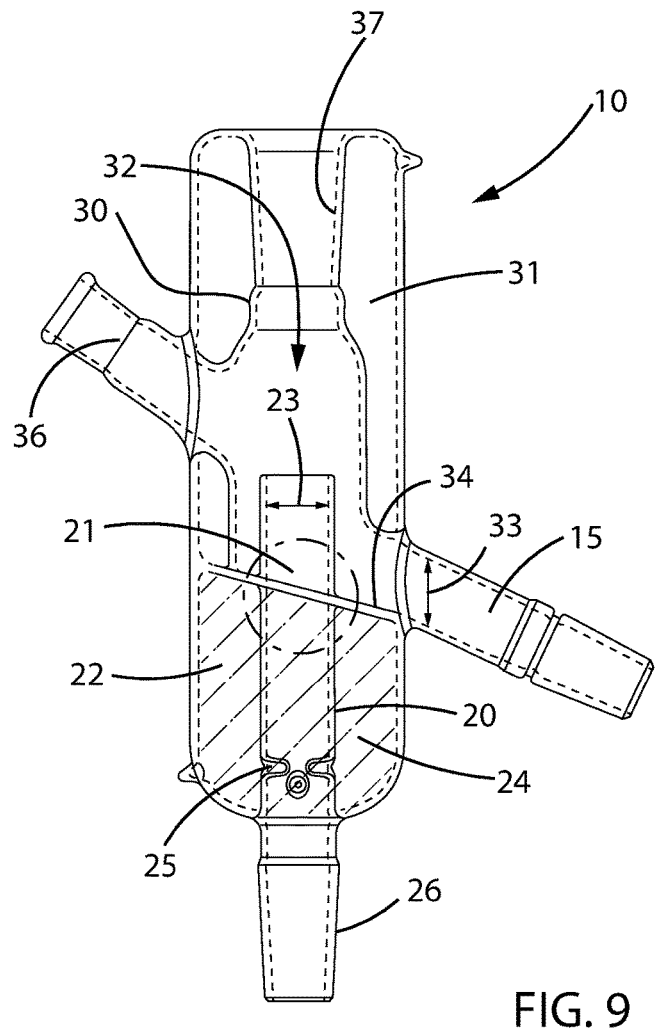
FIG. 8 is side view of another embodiment of a distillation head, showing the shortened upper condenser, a shortened fractionating column, and silvering on the lower insulated chamber.
Figure 9:
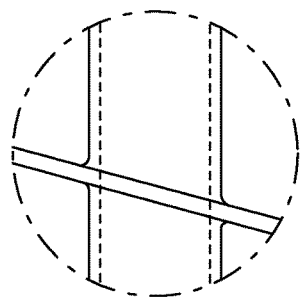
FIG. 9 is a close up of the embodiment of a distillation head from FIG. 8, showing detail of the column passing through the floor of the condenser.
Figure 10:
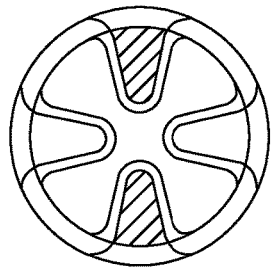
FIG. 10 is a top close up view of the interior of the embodiment of a distillation head from FIG. 8, showing detail of the restriction in the column.

In one embodiment, shown at FIG. 8, the distillation head 10 is a cylinder that is approximately 262 mm long from a top end to a bottom end and has an outer diameter of 64 mm. In one embodiment, the diameter of the interior of the condenser 32 is 19 mm. In one embodiment, the inner diameter of the column 21 is 18.4 mm. In one embodiment, the inner diameter of the distillation port 15 is 18.4 mm. In one embodiment, the fractionating column 21 extends about 30 mm above the floor 34 of the condenser 32 and about 74 mm below the floor 34 of the condenser 32, where it connects to a joint 26 that can add about 55 mm to the length of the fractionating column 21. In one embodiment, the floor 34 is angled at a 75° angle from the vertical fractionating column 21 (i.e., 15° downward from horizontal). In one embodiment, the distillation port 15 continues out of the condenser 32 from the floor 34 at approximately a 62° angle from the vertical. In one embodiment, the distillation port 15 extends about 85 mm (including the joint) from the exterior of the condenser 32. In one embodiment, the optional inlet port 36 is positioned at a 55° angle from the vertical fractionating column 21 and extends about 55 mm, including the joint, from the exterior of the condenser 32. In one embodiment, as shown in FIG. 9, the interior walls of the fractionating column 21 are straight as the column 21 passes through the floor 34. In one embodiment, as shown in FIGS. 8 and 10, the fractionating column 21 has a restriction area 25 in the bottom half of the column 21 that is formed by four indents positioned around the interior of the column, each at about 90° apart from the next. In one embodiment, two of the indents are on one vertical plane and two of the indents are on another vertical plane, separated, in one embodiment, by approximately 5 mm. In one embodiment, the restriction area is about 15 mm above the bottom of the lower insulation chamber 22. In one embodiment, the condenser 32 is about 136 mm long at its center, extending from the floor 34 to the top of the distillation head 10. In one embodiment, the distillation head 10 is about 207 mm from the top of the exterior of the upper insulation chamber 31 to the bottom of the exterior of the lower of the lower insulation chamber 22. In one example, a joint 26 at the bottom of the column 21 extends about 55 mm from the end of the lower insulation chamber 22. In one embodiment, the silver lining 24 covers the interior of the lower insulation chamber 22 located below the floor 34.

Figure 11:
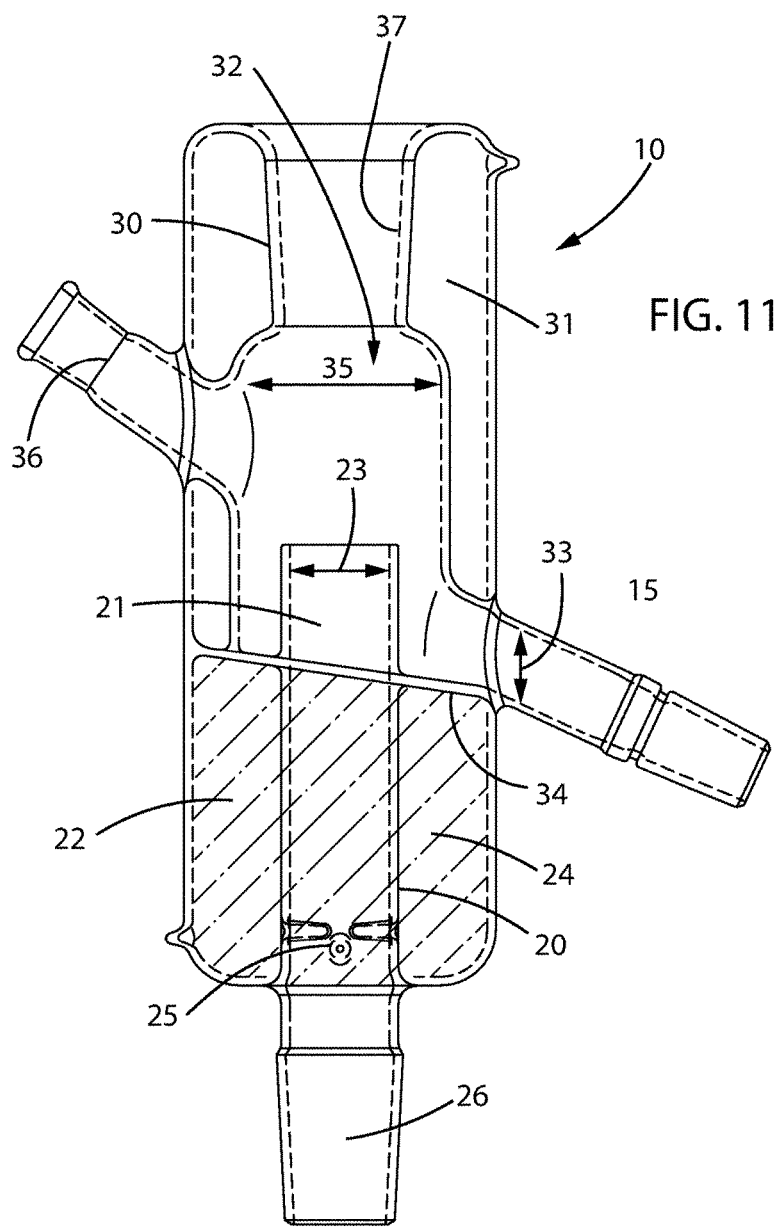
FIG. 11 is a side view of another embodiment of a distillation head, showing a larger diameter condenser and fractionating column.

In another embodiment, shown at FIG. 11, the distillation head is a cylinder that is approximately 300 mm long from a top end to a bottom end and has an outer diameter of 85 mm. In one embodiment, the diameter of the interior of the condenser 32 is 80 mm. In one embodiment, the interior diameter of the column 21 is 30 mm. In one embodiment, the interior diameter of the distillation port 15 is 18.4 mm. In one embodiment, the fractionating column 21 extends about 30 mm above the floor 34 of the condenser 32 and about 90 mm below the floor 34 of the condenser 32. In one embodiment, the fractionating column 21 extends an additional approximately 65 mm through a joint 26 at the bottom of the distillation head 10. In one embodiment, the floor 34 is angled at about an 82° angle from the vertical fractionating column 21 (i.e., 8 degrees downward from the horizontal). In one embodiment, the distillation port 15 continues out of the condenser 32 from the floor 34 at a 65° angle from the vertical. In one embodiment, the distillation port 15 extends about 85 mm from the exterior of the condenser 32. In one embodiment, the inlet port 36 is positioned at a 55° angle from the vertical fractionating column 21 and extends about 55 mm from the exterior of the condenser 32, including the joint. In one embodiment, the fractionating column 21 extends an additional approximately 65 mm through a joint 26 at the bottom end of the distillation head 10. In one embodiment, as shown in FIG. 11, the interior walls of the fractionating column 21 are straight as the column 21 passes through the floor 34. In one embodiment, the fractionating column 21 has a restriction area 25 in the bottom half of the column 21 that is formed by four indents positioned around the interior of the column, each at about 90° apart from the next. In one embodiment, the two of the indents are on one vertical plane and two of the indents are on another vertical plane, each plane separated, in one embodiment, by approximately 5 mm. In one embodiment, the restriction area is about 15 mm above the bottom of the lower insulation chamber 22. In one embodiment, the condenser is about 145 mm long, extending from the floor 34 to the top of the distillation head 10. In one embodiment, the distillation head 10 is about 235 mm from the top of the exterior of the upper insulation chamber 31 to the bottom of the exterior of the lower of the lower insulation chamber 22. In one example, a joint 26 at the bottom of the column 21 extends about 65 mm from the end of the lower insulation chamber 22. In one embodiment, the silver lining 24 covers the interior of the lower insulation chamber 22 starting below the floor 34.

Figure 12:
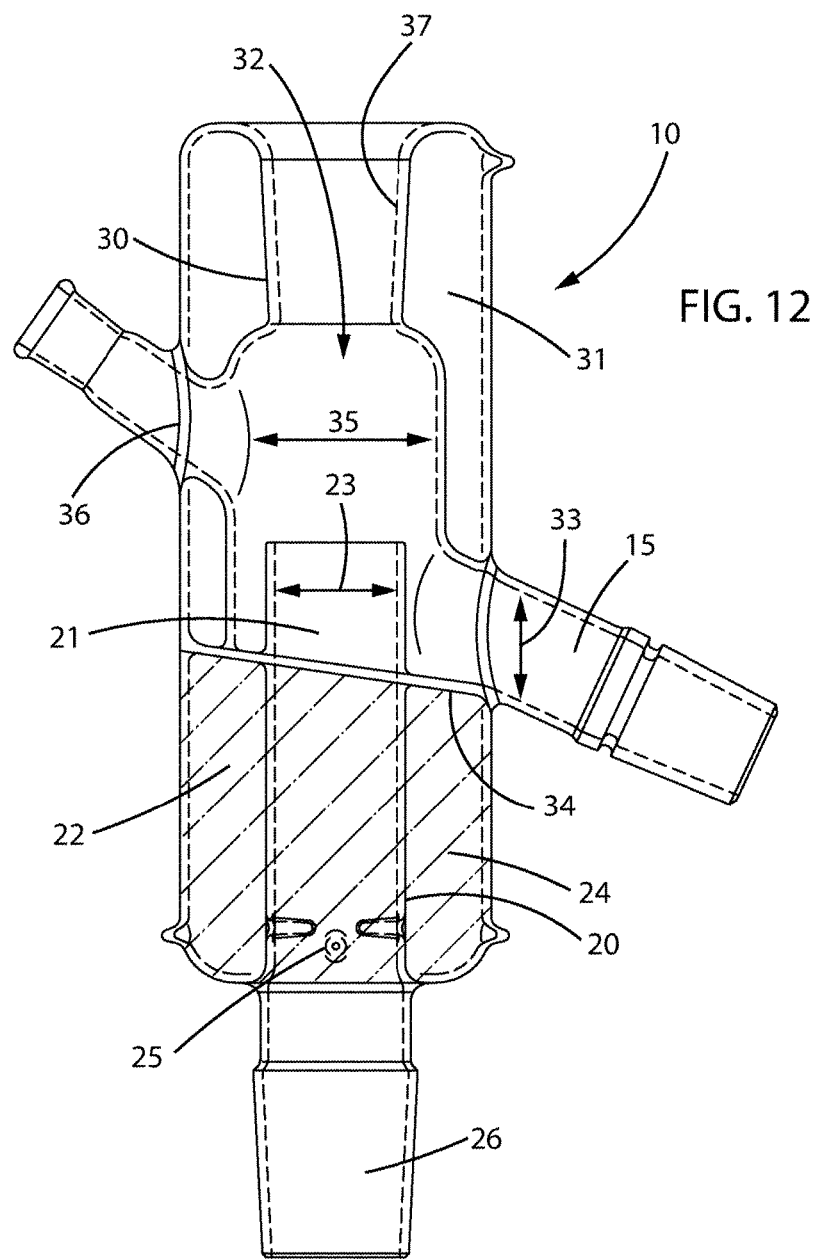
FIG. 12 is a side view of another embodiment of a distillation head, showing a larger diameter condenser and a wider exit port.

In yet another embodiment, shown at FIG. 12, the distillation head is a cylinder that is approximately 310 mm long from a top end to a bottom end and has an outer diameter of 85 mm. In one embodiment, the diameter of the interior of the condenser 32 is 80 mm. In one embodiment, the interior diameter of the column 21 is 40 mm. In one embodiment, the diameter of the distillation port 15 is 30 mm. In one embodiment, the fractionating column 21 extends about 30 mm above the floor 34 of the condenser 32 and about 90 mm below the floor 34 of the condenser 32. In one embodiment, the floor 34 is angled at approximately an 82° angle from the vertical fractionating column 21 (approximately 8° angle downward from the horizontal). In one embodiment, the distillation port 15 continues out of the condenser 32 from the floor 34 at a 65° angle from the vertical. In one embodiment, the distillation port 15 extends about 85 mm from the exterior of the condenser 32. In one embodiment, the optional inlet port 36 is positioned at a 55° angle from the vertical fractionating column 21 and extends about 55 mm from the exterior of the condenser 32. In one embodiment, the interior walls of the fractionating column 21 are straight as the column 21 passes through the floor 34. In one embodiment, the fractionating column 21 has a restriction area 25 in the bottom half of the fractionating column 21 that is formed by four indents positioned around the interior of the column, each at about 90° apart from the next. In one embodiment, the two of the indents are on one vertical plane and two of the indents are on another vertical plane, separated, in one embodiment, by approximately 5 mm. In one embodiment, the restriction area is about 15 mm above the bottom of the lower insulation chamber 22. In one embodiment, the condenser is about 140 mm long, including the joint, extending from the floor 34 to the top of the distillation head 10. In one embodiment, the distillation head 10 is about 235 mm from the top of the exterior of the upper insulation chamber 31 to the bottom of the exterior of the lower of the lower insulation chamber 22. In one example, a joint 26 at the bottom of the fractionating column 21 extends about 75 mm from the bottom of the lower insulation chamber 22. In one embodiment, the silver lining 24 covers the interior of the lower insulation chamber 22 starting below the floor 34.

Figures 13, 14:
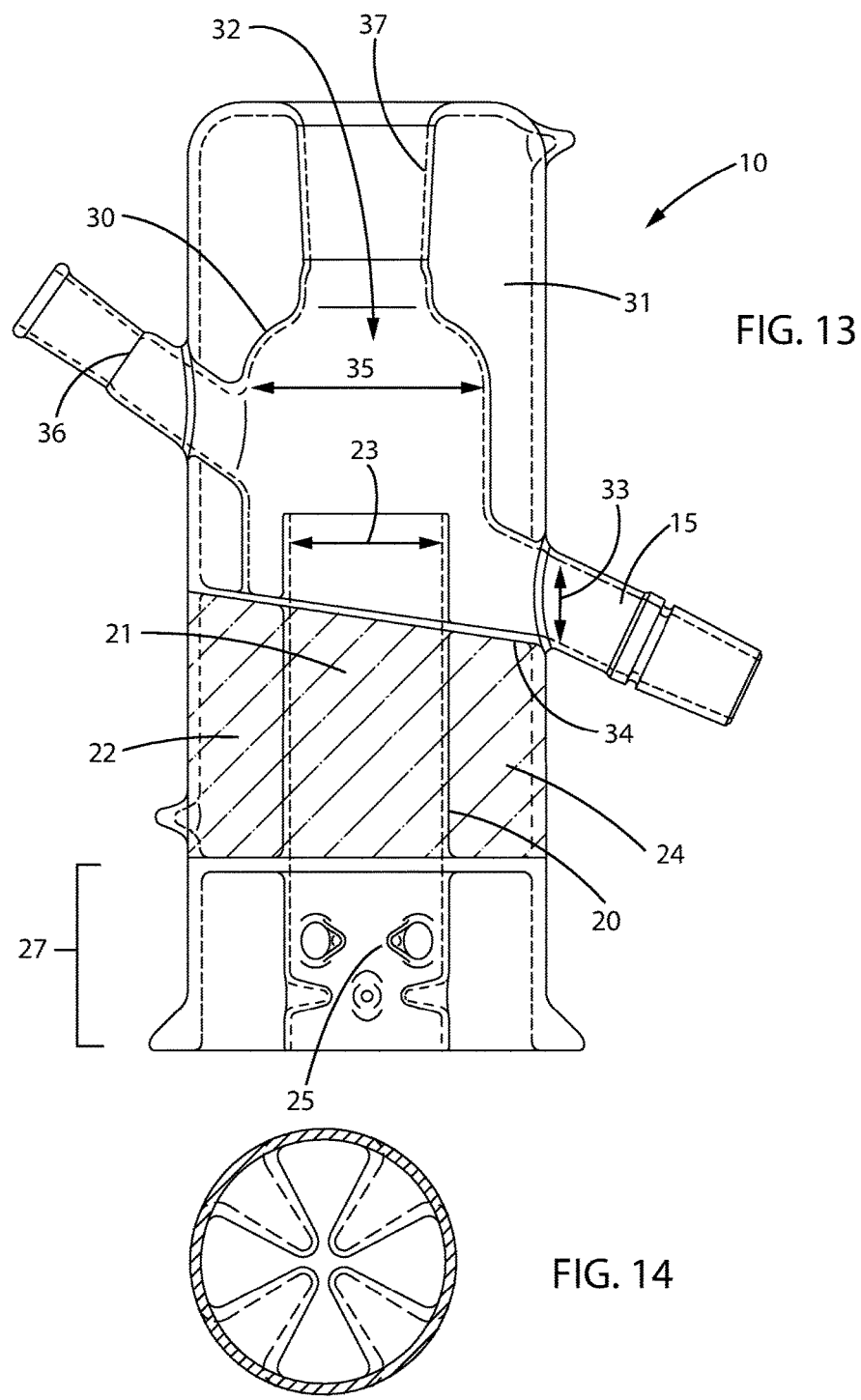
FIG. 13 is a side view of another embodiment of a distillation head, showing a larger diameter condenser and an open bottom design to fit a flanged flask.
FIG. 14 is a top close up view of the embodiment of a distillation head from FIG. 14, showing detail of Vigreux indents in the column.

In yet another embodiment, shown at FIG. 13, the distillation head is a cylinder that is 345 mm long from a top end to a bottom end and has an outer diameter of 130 mm. In one embodiment, the diameter of the interior of the condenser 32 is 86 mm. In one embodiment, the interior diameter of the column 21 is 56-60 mm. In one embodiment, the diameter of the distillation port 15 is 30 mm. In one embodiment, the fractionating column 21 extends about 30 mm above the floor 34 of the condenser 32 and about 165 mm below the floor 34 of the condenser 32. In one embodiment, the floor 34 is angled at approximately an 82° angle from the vertical fractionating column 21 (i.e., approximately 8° downward from the horizontal). In one embodiment, the distillation port 15 continues out of the condenser 32 from the floor 34 at approximately a 65° angle from the vertical. In one embodiment, the distillation port 15 extends about 85 mm from the exterior of the condenser 32. In one embodiment, the inlet port 36 is positioned at a 55° angle from the vertical fractionating column 21 and extends about 75 mm from the exterior of the condenser 32. In one embodiment, as shown in FIG. 13, the interior walls of the fractionating column 21 are straight as the fractionating column 21 passes through the floor 34. In one embodiment, the fractionating column 21 has indents 25 in the bottom half of the column 21 positioned around the interior of the column, each at about 90° apart from the next. In one embodiment, two or more of the indents are on one vertical plane and two or more of the indents are on another vertical plane. In some embodiments, the fractionating column can have two, three, four, or more indents on each vertical plane. In some embodiments, the fractionating column can have one, two, three, or more vertical planes of indents. In some embodiments, each plane of indents is rotated so that the indents do not align vertically from one plane to another. In one embodiment, the indents of one plane bisect the spaces between the indents of another plane. The planes are separated vertically, in one embodiment, by approximately 20 mm. FIG. 14 shows indents as seen looking downward through the fractionating column 21. In one embodiment, the restriction area is about 30 mm below the bottom of the lower insulation chamber 22. In one embodiment, the condenser is about 175 mm long, extending from the floor 34 to the top of the distillation head 10. In one example, a reactor lid clamp 27 at the bottom of the column 21 extends about 70 mm from the end of the lower insulation chamber 22. In one embodiment, the distillation head 10 is about 245 mm from the top of the exterior of the upper insulation chamber 31 to the bottom of the exterior of the lower of the lower insulation chamber 22. In one embodiment, the silver lining 24 covers the interior of the lower insulation chamber 22 starting below the floor 34.

FIG. 14 shows, in one embodiment, a top view of a single ring of indents in a fractionating column, having four indents on the same vertical plane, each indent positioned 90 degrees from the next indent forming a ring. In other embodiments, one, two, three or more independent rings of indents are positioned on different vertical planes inside the fractionating column. For example, FIG. 13 shows two rings of indents 25, each ring formed by four different indents 25.

Figure 15:
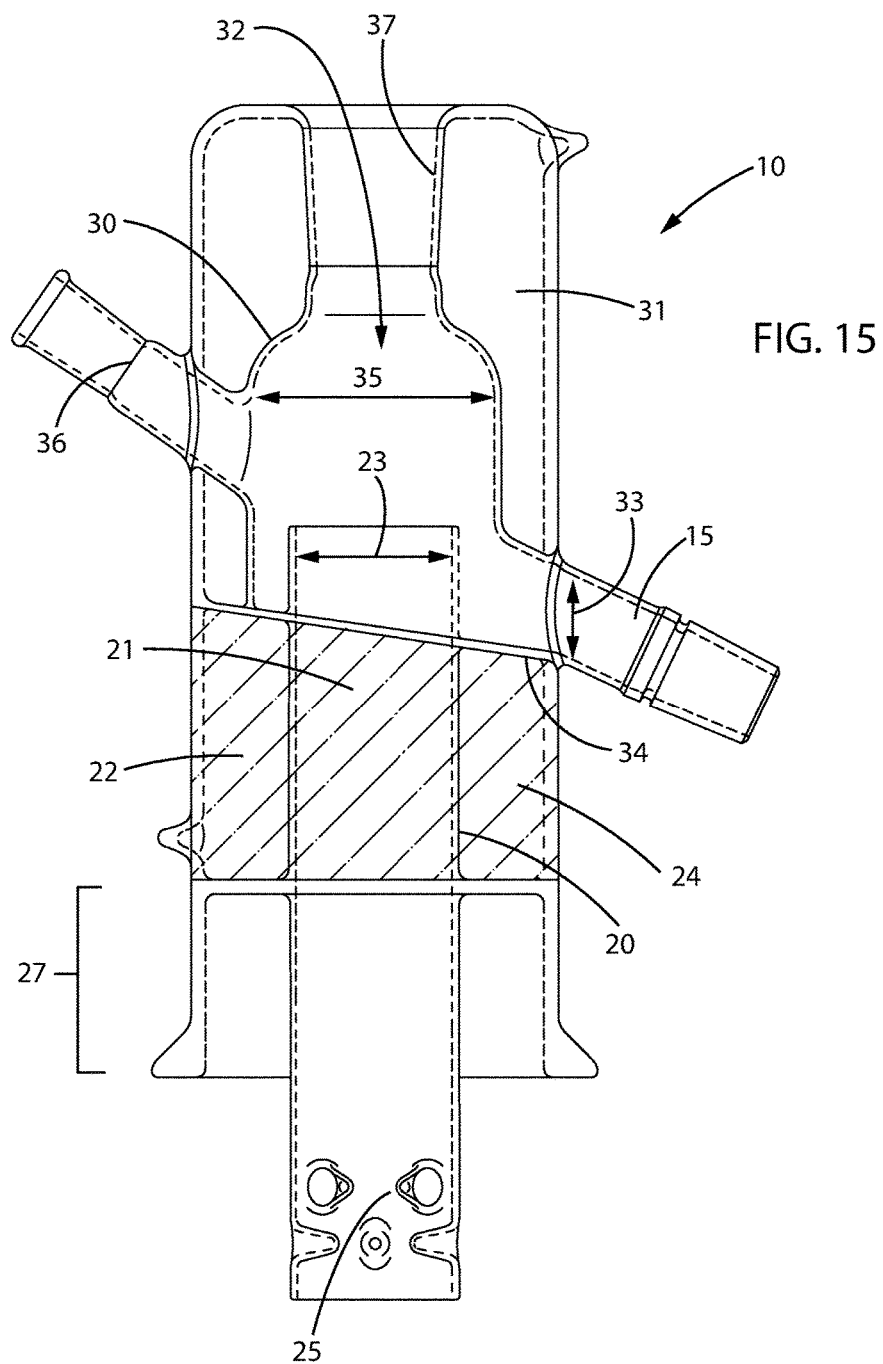
FIG. 15 is a side view of another embodiment of a distillation head, showing a larger diameter condenser and an open bottom design to fit a flanged flask, with the fractionating column extending below the bottom of the distillation head.

In another embodiment, shown at FIG. 15, a distillation head 10 has features similar to the embodiment shown in FIG. 13 except that the fractionating column 21 is much longer so that it can extend down into a flask when the head is positioned on a flanged flask. In such an embodiment, the indents 25 can be moved lower in the fractionating column 21 (shown) or they can remain higher in the fractionating column (not shown).

Figure 16:
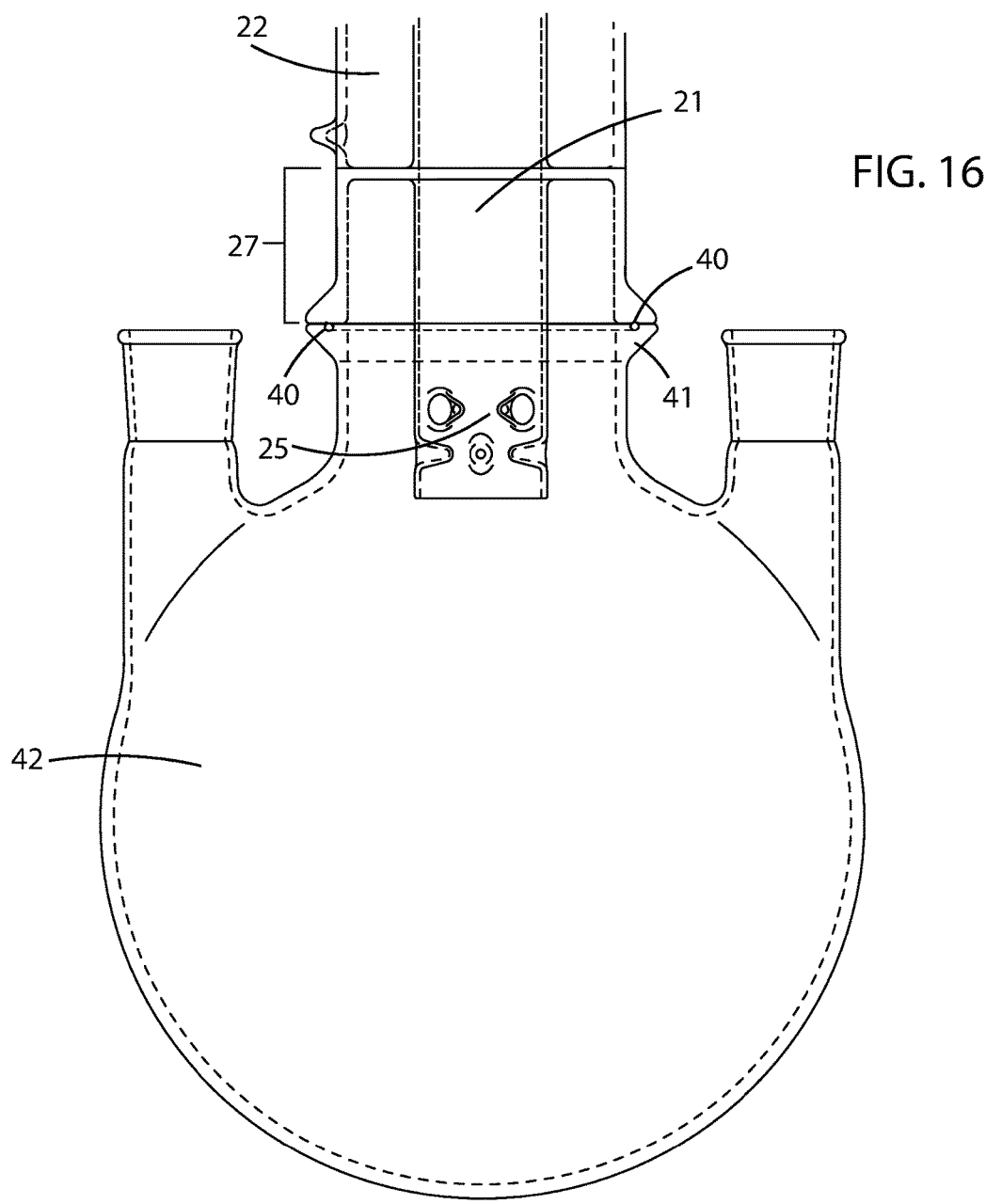
FIG. 16 is a side view of the intersection of a bottom of a distillation head of FIG. 15, attached to a round-bottom flanged flask, with the fractionating column extending below the bottom of the distillation head into the round-bottom flask.

FIG. 16 shows one embodiment of the distillation head 10 attached to a round-bottom flask 42. The flanges at the bottom of the distillation head fit the flanges of the flask 41, and an o-ring or gasket 40 seals the connection between the distillation head 10 and the flask 42. In one embodiment, the indents 25 at the bottom of the fractionating column 21 extend downward from the distillation head 10 into the flask 42. In such an embodiment, the gasket 40 connects a continuous pocket or area 27 around the fractionating column 21 with the flask 42. This pocket or area 27 becomes a continuation of the heated flask 42, having similar a similar temperature profile as the flask 42 and allows the heat from the flask 42 to heat the fractionating column 21 from multiple sides. In one embodiment, the bottom of the lower jacket 22 can be lower so that the area 27 is decreased. In another embodiment, the bottom of the lower jacket 22 can be higher so that the area 27 is increased. The flask 42 can be any flask or vessel with a mouth or opening that will seal to the bottom of the distillation head 10.

The distillation head and process described herein may be utilized for the distillation of cannabinoids. This distillation head and process may also be used for other high boiling point compounds. The devices, apparatuses, and methods disclosed herein may have particular applicability to fractionate and separate high boiling point compounds, such as cannabinoids, from other constituents found in *cannabis* oils or other constituents from other herbs. Nonetheless, the devices, apparatuses, and methods disclosed herein may equally apply to the distillation of other compounds.

In particular embodiments of the processes disclosed herein, high boiling point compounds may be distilled under deep vacuum pressure, for example, those below 1 Torr. In some embodiments, distillation using the device may occur at pressures between 0 and 1500 mTorr. Depending on the pressure within the boiling flask, distillation head, and otherwise within the system, the heated temperature may range from ambient to 230° C.

Certain embodiments provide for a distillation head made from borosilicate glass, stainless steel, or a combination thereof, though other materials may be used without departing from the scope of the current disclosure.

While various embodiments of the present disclosure have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present invention should not be limited by any of the above-described exemplary embodiments.

What is claimed is:

1. A device comprising a distillation head, the distillation head comprising:
    a column with a surrounding insulation chamber, the column having an inner diameter and the surrounding insulation chamber having a silvered lining;
    a condenser with a surrounding insulation chamber, the condenser having an inner diameter and a floor; and
    a distillation port, the distillation port having an inner diameter;
    wherein the column extends through the floor of the condenser, further wherein the floor of the condenser slopes downward towards the distillation port; and further wherein the silvered lining of the insulation chamber surrounding the column reflects infrared radiation, preventing it from radiating through the insulation chamber surrounding the column.

2. The distillation head of claim 1, further wherein the inner diameter of the distillation port is substantially equal to or greater than the inner diameter of the column and the inner diameter of the condenser is greater than the inner diameter of the column.

3. The distillation head of claim 2, wherein the insulation chamber around the column is a vacuum chamber.

4. The distillation head of claim 2, wherein the insulation chamber around the condenser is a vacuum chamber.

5. The distillation head of claim 3, wherein the insulation chamber around the condenser is a vacuum insulation chamber.

6. The distillation head of claim 1, wherein the insulation chamber around the condenser is a vacuum chamber.

7. The distillation head of claim 1, further comprising an indent in the column.

8. The distillation head of claim 1, wherein the column further comprises an interior wall, wherein the interior wall is straight at the point where the column passes through the floor of the condenser.

9. The distillation head of claim 1, further comprising an inlet port to the condenser, which inlet port passes through the insulation chamber around the condenser.

10. The distillation head of claim 1, whereby the distillation head is used to separate constituents from herbs.

11. The distillation head of claim 1, wherein the actual color of the silvered lining is silver, gold, bronze, or rose gold.

12. The distillation head of claim 1, wherein the column further comprises a length, and the insulation chamber surrounding the column extends less than the length of the column.

13. A device comprising a distillation head, the distillation head comprising
a column encircled by a lower insulation chamber, the column having a first diameter and the lower insulation chamber having silvering;
a condenser encircled by an upper insulation chamber, the condenser having a second diameter and a floor; and
an exit port, the exit port having a third diameter;
wherein the column extends through the floor of the condenser, further wherein the floor of the condenser slopes downward towards the exit port, further wherein the third diameter is substantially equal to or greater than the first diameter and the second diameter is greater than the first diameter; and further wherein the silvering of the lower insulation chamber prevents heat from radiating through the lower insulation chamber.

14. The distillation head of claim 13, wherein the lower insulation chamber around the column is a vacuum chamber.

15. The distillation head of claim 13, wherein the upper insulation chamber around the condenser is a vacuum chamber.

16. The distillation head of claim 13, wherein the actual color of the silvering is silver, gold, bronze, or rose gold.

17. The distillation head of claim 13, wherein the column further comprises a length, and the lower insulation chamber extends less than the length of the column.

18. A method of distilling a compound comprising the steps of
supplying a vapor from a contained source to a distillation head, where the distillation head comprises:
a column with a surrounding insulation chamber, the column having an inner diameter and the surrounding insulation chamber having a silvered lining;
a condenser with a surrounding insulation chamber, the condenser having an inner diameter and a floor; and
a distillation port, the distillation port having an inner diameter;
wherein the column extends through the floor of the condenser, the floor of the condenser slopes downward towards the distillation port, the inner diameter of the distillation port is substantially equal to or greater than the inner diameter of the column, and the inner diameter of the condenser is greater than the inner diameter of the column; further wherein the silvered lining of the surrounding insulation chamber reflects infrared radiation, preventing it from escaping the column;
condensing the vapor to a liquid in the condenser; and
collecting liquid from the distillation port.

19. The method of distilling of claim 18, wherein the insulation chamber around the column is a vacuum chamber.

20. The method of distilling of claim 18, wherein the insulation chamber around the condenser is a vacuum chamber.

21. The method of distilling of claim 19, wherein the insulation chamber around the condenser is a vacuum insulation chamber.

22. The method of distilling of claim 18, wherein the insulation chamber around the column is a vacuum chamber.

23. The method of distilling of claim 18, wherein the vapor is supplied to the distillation head through the column.

24. The method of distilling of claim 18, further comprising the step of maintaining a temperature differential of between about 5° and 30° Celsius between the condenser and the column.

25. The method of distilling of claim 18, wherein the contained source is a boiling flask attached to the distillation head.

* * * * *